United States Patent
Monceaux et al.

(10) Patent No.: US 12,011,828 B2
(45) Date of Patent: Jun. 18, 2024

(54) METHOD FOR CONTROLLING A PLURALITY OF ROBOT EFFECTORS

(71) Applicant: SPOON

(72) Inventors: Jérôme Monceaux, Paris (FR);
Thibault Hervier, Vincennes (FR);
Aymeric Masurelle, Paris (FR)

(73) Assignee: SPOON, Paris (FR)

( * ) Notice: Subject to any disclaimer, the term of this patent is extended or adjusted under 35 U.S.C. 154(b) by 768 days.

(21) Appl. No.: 17/052,703

(22) PCT Filed: Apr. 26, 2019

(86) PCT No.: PCT/FR2019/050983
§ 371 (c)(1),
(2) Date: Mar. 10, 2021

(87) PCT Pub. No.: WO2019/211552
PCT Pub. Date: Nov. 7, 2019

(65) Prior Publication Data
US 2022/0009082 A1 Jan. 13, 2022

(30) Foreign Application Priority Data
May 4, 2018 (FR) ...................... 1853868

(51) Int. Cl.
*B25J 9/00* (2006.01)
*B25J 9/16* (2006.01)
*B25J 15/00* (2006.01)

(52) U.S. Cl.
CPC ........... *B25J 9/0084* (2013.01); *B25J 9/1602* (2013.01); *B25J 15/0052* (2013.01)

(58) Field of Classification Search
CPC .... B25J 9/0084; B25J 9/1602; B25J 15/0052; B25J 11/001
See application file for complete search history.

(56) References Cited

U.S. PATENT DOCUMENTS

2003/0187653 A1* 10/2003 Okubo .................... G10L 15/26
704/E15.045
2011/0178619 A1* 7/2011 Jung ........................ G06F 21/10
700/95

(Continued)

FOREIGN PATENT DOCUMENTS

| EP | 1494210 B1 | 1/2007 |
| EP | 1486300 B1 | 8/2011 |

(Continued)

OTHER PUBLICATIONS

International Search Report for International Application No. PCT/FR2019/050983 dated Sep. 23, 2019, 2 pages.

(Continued)

*Primary Examiner* — Sohana Tanju Khayer
(74) *Attorney, Agent, or Firm* — TraskBritt

(57) ABSTRACT

A method for controlling effectors of a robot by means of primitives made up of parameterizable coded functions, the primitives being activated conditionally by actions selected by an action selection system, the method based on associating coded objects with a sequence of characters corresponding to their semantic description, and comprising: i. a semantic description of the coded objects stored in the memory, made up of a string of characters representing a perception function of the robot and of another string of characters representing a perceived object, ii. a semantic description of the primitives, made up of a string of characters representing a possible action of the robot and of another, optional string of characters representing the optional parameters of this action, iii. a semantic description of rules made up of the combination of a string of characters representing the associated context and another string of characters representing the associated action.

7 Claims, 2 Drawing Sheets

(56) References Cited

U.S. PATENT DOCUMENTS

| | | | | |
|---|---|---|---|---|
| 2014/0347265 | A1* | 11/2014 | Aimone | H04W 4/30 |
| | | | | 345/156 |
| 2015/0362988 | A1* | 12/2015 | Yamamoto | G06F 3/011 |
| | | | | 345/156 |
| 2015/0378444 | A1* | 12/2015 | Yin | G06T 7/194 |
| | | | | 345/156 |
| 2016/0140963 | A1* | 5/2016 | Connell | G10L 21/10 |
| | | | | 704/231 |
| 2017/0148434 | A1* | 5/2017 | Monceaux | B25J 11/0015 |
| 2018/0326583 | A1* | 11/2018 | Baroudi | B25J 9/1661 |
| 2018/0336000 | A1* | 11/2018 | Vaughn | H04R 1/1083 |
| 2019/0172448 | A1* | 6/2019 | Monceaux | G06N 3/008 |
| 2019/0291277 | A1* | 9/2019 | Oleynik | B25J 9/1669 |
| 2019/0313058 | A1* | 10/2019 | Harrison | H04N 21/23418 |
| 2020/0016745 | A1* | 1/2020 | Tang | B25J 11/0005 |

FOREIGN PATENT DOCUMENTS

| | | | | |
|---|---|---|---|---|
| WO | 2013/150076 | A1 | 10/2013 | |
| WO | WO-2013150076 | A1 * | 10/2013 | B25J 11/0005 |

OTHER PUBLICATIONS

International Written Opinion for International Application No. PCT/FR2019/050983 dated Sep. 23, 2019, 7 pages.
Suzuki et al., Measuring Empathy for Human and Robot Hand Pain using Electroencephalography, www.nature.com/scientificreports, published Nov. 3, 2015, 9 pages.

* cited by examiner

METHOD FOR CONTROLLING A PLURALITY OF ROBOT EFFECTORS

CROSS-REFERENCE TO RELATED APPLICATIONS

This application is a national phase entry under 35 U.S.C. § 371 of International Patent Application PCT/FR2019/050983, filed Apr. 26, 2019, designating the United States of America and published as International Patent Publication WO 2019/211552 A1 on Nov. 7, 2019, which claims the benefit under Article 8 of the Patent Cooperation Treaty to French Patent Application Serial No. 1853868, filed May 4, 2018.

TECHNICAL FIELD

This present disclosure concerns the field of communication robots. More precisely, it concerns the management of the resources of the robot to control a functioning of the communication robot to simulate an empathic intelligence allowing interaction with one or more humans by actions that are not simply slave actions (the term "robot" having been imagined in 1920 by the Czech Karel Capek inspired by the word robota meaning "slave" in Slavic languages).

BACKGROUND

Such a robot may take the form of a humanoid robot, an autonomous car or more simply an apparatus with a communication interface allowing bidirectional interaction with one or more humans via multimodal messages (tactile, visual or audible) emitted and received by the robot.

In the article "Measuring empathy for human and robot hand pain using electroencephalography" by Yutaka Suzuki, Lisa Galli, Ayaka Ikeda, Shoji Itakura & Michiteru Kitazaki in "Scientific Reports 5, Article number: 15924 (2015)," the authors describe the functioning of the human brain, specifically its empathic response, when it perceives a robot in a situation that evokes an emotional form, such as pain. The authors of this study present volunteers with either a photograph of a human hand or a robotic hand, each in a situation that may or may not evoke pain (in the image presented to the study participants, an open pair of scissors is displayed, potentially cutting the finger of the hand shown in the image).

Traditionally univocal, the relationship between the robot and the human is becoming reciprocal. Some roboticists are tempted to present robots as "emo robots" (having emotions, a "heart"), which is already the case in Japan with the Pepper robot (trade name) or in France with the Nao robot (trade name). While artificial empathy is always a simulation, robot manufacturers are attempting to present us with machines that would be capable of having real emotions.

State of the Art

In order to meet this need, the European patent granted under number EP1486300 B1 has been proposed describing a behavior control system for a robot that operates autonomously, comprising:
a plurality of behavior description sections for describing the movements of a machine body of the robot;
an external environment recognition section for recognizing an external environment of the machine body;
an internal state management section for managing an internal state of the robot in response to the recognized external environment and/or a result of the execution of a behavior; and
a behavior evaluation section to evaluate the execution of behaviors described in the behavior description sections in response to the external and/or internal environment.

The internal state management section manages emotions, each of which is an index to the internal state in a hierarchical structure having a plurality of layers, and uses the emotions in a layer of primary emotions necessary for individual preservation and another layer of secondary emotions, which vary depending upon excess/deficiency of the primary emotions, and further divides the primary emotions into layers including an innate reflexive or physiological layer and an associative layer based on dimensions.

Also known is the European patent granted under number EP1494210 describing a speech communication system with a function for having a conversation with a conversation partner, comprising:
a speech recognition device to recognize the voice of the conversation partner;
a conversation control means for controlling the conversation with the conversation partner on the basis of a recognition result of the speech recognition means;
an image recognition means for recognizing a face of the conversation partner; and
a search control means for searching for the existence of the conversation partner on the basis of one of the results or both results, which are a recognition result by the image recognition means and a recognition result by the speech recognition means.

The conversation control means continues the conversation when the speech content of the conversation partner obtained as the recognition result by the speech recognition means is identical to the expected response content, even if the search by the search control means fails.

Drawbacks of the Prior Art

The solutions of the prior art dissociate on the one hand the technical resources intended for language processing, and on the other, the technical resources intended for recognition processing of the robot's environment by cameras and possibly other sensors as well as the control of the robot's movements.

As a result, the solutions of the prior art do not allow for enriched learning tasks, which merge semantic inputs and outputs with perceived data and actuations.

In particular, patent EP1486300 does not provide for taking into account the verbal dimension of the interaction between the human and the robot, and thus does not allow, for example, for the robot to learn naturally during interaction with the human.

As for patent EP1494210, it provides only for verbal interaction between the human and the robot to control artificial conversations.

The juxtaposition of the teaching of these two documents would not allow a satisfactory solution to be obtained because the two solutions do not use the same technical grammars and do not allow for verbal information and information perceived by the robot's sensors to be merged into the same semantic set.

Moreover, the internal state of the robot corresponding to an "emotion" is exclusively translated by the selection of an action chosen among a collection of actions associated with emotions, which considerably limits the possibilities of empathic intelligence in real time with the human.

The solutions of the prior art lead to fixed emotional appearances, in a weakly responsive manner with respect to the attitude of the human in interaction with the robot. The credibility of the emotional appearance is mediocre due to the absence of real-time modifications, which prevents the cognitive load of the human interacting with the robot from being reduced.

BRIEF SUMMARY

The object of the present disclosure is to respond to these drawbacks by proposing, according to the most general acceptance of the present disclosure, a method for controlling a plurality of effectors of a robot by a plurality of primitives made up of parameterizable coded functions:
  the primitives being activated conditionally by actions selected by an action selection system
  the action selection system:
    comprising a declarative memory wherein is stored a dynamic library of rules, each associating a context with an action
    based on a list of coded objects stored in a memory determining the robot's representation of the world
  the coded objects stored in the memory being computed by perception functions
  the perception functions being computed from signals provided by the robot's sensors
wherein the method is based on associating, in every step, coded objects with a sequence of characters corresponding to their semantic description, in particular, with:
  i. a semantic description of the coded objects stored in the memory, made up of a string of characters representing a perception function of the robot and another string of characters representing a perceived object
  ii. a semantic description of the primitives, made up of a string of characters representing a possible action of the robot and another, optional string of characters representing the optional parameters of this action
  iii. a semantic description of the rules (102 to 106), made up of the combination of a string of characters representing the associated context and another string of characters representing the associated action.

Advantageously, the action selection system classifies the rules based on the proximity of the context of each of these rules to the context computed from the content of the objects contained in the memory and selects the actions associated with the rules relevant to the context.

According to the embodiments:
  the method further comprises steps for recording new rules associated with a new action, via a learning module, based, for example, on speech recognition, gesture recognition or mimicry;
  the method comprises a step of computing, for each rule, an IS parameter, which is recomputed after each execution of the associated action, wherein the order of priority of the actions selected by the action selection system is determined based on the value of the IS parameter associated with each of the actions;
  the method further comprises steps of communicating with other robots via a communication module and a shared server, wherein the declarative memory of the robot's action selection system is periodically synchronized with the contents of the shared server.
  the activation of primitives by actions is filtered by a resource manager ensuring the compatibility of the commands sent to the effectors;
  the method further comprises:
    i. steps for constantly updating, in the background, internal state variables $VEI_x$, based on the evolution of objects stored in the memory (80).
    ii. steps for parameterizing the action primitives (131 to 134), the perception functions (72 to 75) and the action selection module (100) based on the values of the internal state variables $VEI_x$.

The present disclosure also relates to a robot comprising a plurality of effectors controlled by a controller executing a process according to the present disclosure.

BRIEF DESCRIPTION OF THE DRAWINGS

This present disclosure will be better understood by reading the following detailed description of a non-limiting example of the present disclosure, with reference to the accompanying drawings wherein.

DETAILED DESCRIPTION

Hardware Architecture

Figure 1:
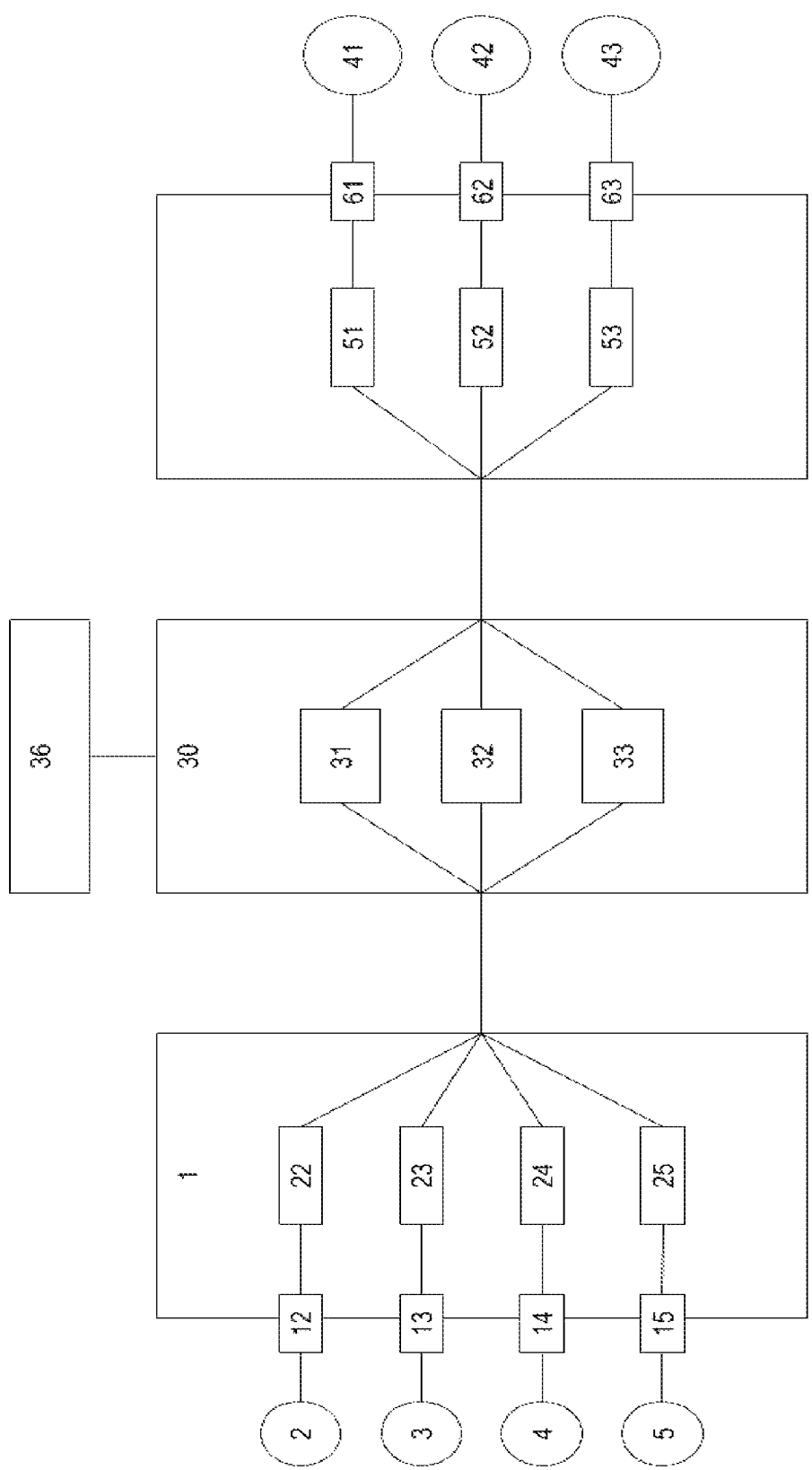
FIG. 1 shows a hardware architecture of the present disclosure.

The robot, according to the embodiment described in FIG. 1, has communication interface circuits (1) with sensors (2 to 5), for example:
  a microphone
  a microphone array for the spatial location of the sound source
  an RGB camera
  a thermal camera
  a depth camera
  a tactile sensor
  a touchscreen
  force feedback sensors
  thermal sensors
  contact sensors
  a radio-frequency reader
  etc.

Each sensor (2 to 5) is associated with a physical driver circuit (12 to 15) "driver," integrated in the sensor or provided on the communication interface circuit (1).

The communication interface circuit (1) brings together the circuits for pre-processing (22 to 25) the signals supplied by the sensors (2 to 5) to transmit the information to the main computer (30) or to dedicated computers (31 to 33). Some pre-processing circuits (22 to 25) may be made up of specialized circuits, such as image analysis circuits or speech recognition circuits.

The dedicated computers (31 to 33) receive signals from certain sensors (2 to 5), as well as commands from the main computer (30), to compute instructions, which are transmitted to pre-processing circuits (51 to 53) for the computation of the action parameters of an effector (41 to 43). These parameters are exploited by interface circuits (61 to 63) to provide the effectors (41 to 43) with control signals, for example, in the form of pulse-width modulated electrical signals PWM.

Moreover, the main computer (30) is associated with a communication module (36) for data exchange with external resources, e.g., the interne.

The effectors (41 to 43) are, for example, made up of:
motors
a motorized joint
speakers
display screens
LEDs
audible warnings
odor diffusers
pneumatic actuators
circuits for telecommunications with external equipment, such as an electronic payment server or a home automation system.

Functional Architecture

Figure 2:
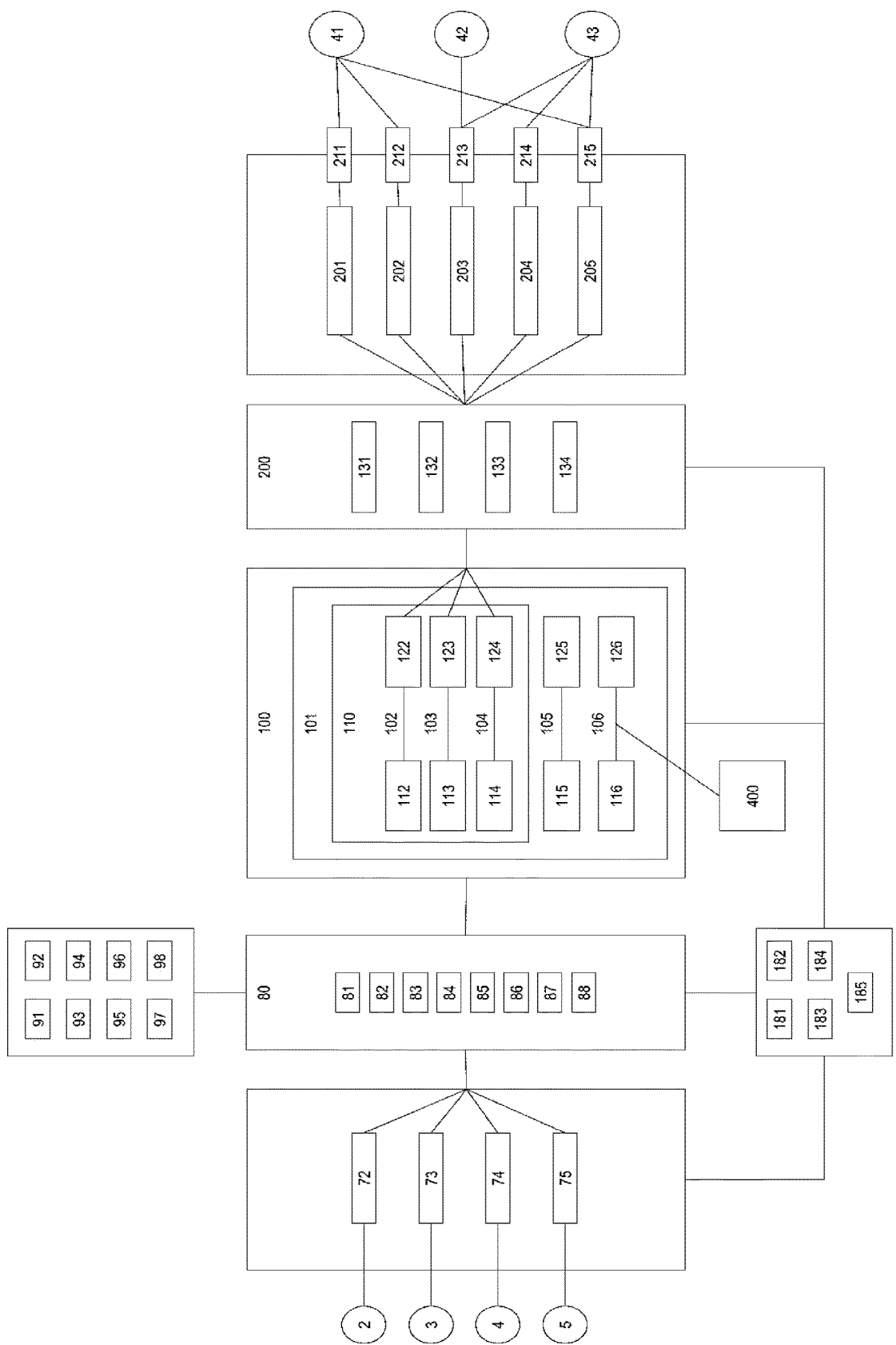
FIG. 2 shows a functional architecture of the present disclosure.

FIG. 2 shows the functional architecture of an embodiment of the robot.

Description of the Perception Functions

The information from the sensors (2 to 5) provides information allowing the computation, via perception functions (72 to 75), of digital metadata, image of the semantic representation that the robot makes of the world.

Each of these perception functions (72 to 75) receives pre-processed data from one or more sensors (2 to 5) to compute the metadata corresponding to a perception type.

For example,
a first perception function (72) computes a distance between the robot and a detected object,
a second perception function (73) performs image recognition to characterize the detected objects
a third perception function (74) performs speech recognition to return a sequence of characters corresponding to the sentence spoken by a user
etc.

These digital metadata are made up of objects coded in object language, for example, in C# or C++. These metadata comprise all or part of the following elements:
a semantic description in the form of a sequence of characters, for example, "I SEE A MAN 1 METER AWAY AND 20 DEGREES TO THE RIGHT"
a type, for example, "HUMAN"
a position in three-dimensional space, e.g., "X=354, Y=153, Z=983"
a rotation in space characterized by a quaternion, e.g., "Q=[X=0, Y=0, Z=0, w=1]"
object-specific attributes, for example, for a human "AGE, SEX, HEIGHT, etc."

The set of coded objects corresponding to the selection functions is stored in a memory (80) the content of which expresses the representation of the world as perceived by the robot.

Description of the Condensation Functions

Processing (91 to 98) is applied to this set of coded objects in the background by condensation functions, which extract characteristic data for each of the objects and group together coded objects sharing the same characteristic data.

For example, a first condensation function performs face recognition processing on human-type detected objects, based on the following objects:
Object 1: "I SEE A MAN 1 METER AWAY AND 20 DEGREES TO THE RIGHT" the object 1 also comprising a corresponding image file
Object 2: "I HAVE RECOGNIZED PAUL"
This processing modifies object 1, which becomes "I SEE PAUL 1 METER AWAY AND 20 DEGREES TO THE RIGHT."

A second condensation function performs the association processing of a person with a recognized sound, based on the following objects:
Object 1: "I SEE A MAN 1 METER AWAY AND 20 DEGREES TO THE RIGHT"
Object 3: "I HAVE RECOGNIZED THE PHRASE 'HELLO' 20 DEGREES TO THE RIGHT"
This processing modifies the object 1, which becomes "I SEE A MAN 1 METER AWAY AND 20 DEGREES TO THE RIGHT WHO SAYS 'HELLO' TO ME."

A third condensation function performs the association processing of the two objects, from the following recomputed objects:
"I SEE PAUL 1 METER AWAY AND 20 DEGREES TO THE RIGHT"
"I SEE A MAN 1 METER AWAY AND 20 DEGREES TO THE RIGHT WHO SAYS 'HELLO' TO ME"
to modify the object 1 thusly "I SEE PAUL 1 METER AWAY AND 20 DEGREES TO THE RIGHT WHO SAYS 'HELLO' TO ME"

The condensation processing (91 to 98) is applied recursively to the contents of the memory (80) containing the robot's representation of the world.

Description of the Selection of Rules and Actions

The system further comprises an action selection system ("rule manager") (100), which comprises a declarative memory (101) in which is stored a library of rules (102 to 106) associating a context (112 to 116) with an action (122 to 126).

For example, a first rule R1 is made up of a numerical sequence of the type:
"IF YOU HEAR A MAN SAY HELLO TO YOU, ANSWER 'HELLO SIR'"
and a second R2 rule is made up of a numerical sequence of the type:
"IF YOU HEAR A HUMAN SAY HELLO TO YOU, AND THAT HUMAN'S NAME IS #FIRSTNAME, SAY 'HELLO #FIRSTNAME'"
and a third rule R3 is made up of a numerical sequence of the type:
"IF YOU HEAR A NOISE AND IT IS BETWEEN 2:00 A.M. AND 4:00 A.M., SEND YOUR OWNER A PICTURE OF WHAT YOU SEE."

An action (122 to 126) materializes by a numerical sequence designating a tree of primitives (131 to 134) executed by the robot effectors, such as:
Action 1 "SEND A MESSAGE TO YOUR OWNER" corresponds to a unitary sequence made up of a single primitive (131 to 134):
sending a message.
Action 2 "SMILE" corresponds to a composite sequence comprising several primitives (131 to 134):
Management of the mouth shape, with the parameters "deformation file $FD_2$" and "amplitude 0.2"
Management of opening the eyes, with the parameter "opening 0.1"
Emit a characteristic sound, with the parameters "sound file $S_7$," "duration 2 s" and "intensity 0.2"
Action 3 "EXPRESS TERROR" corresponds to a composite sequence comprising several primitives (131 to 134):
enlarge eye size with the parameters "deformation file $FD_{213}$" and "amplitude 0.5"
move your arm in an oscillating way, with the parameters "movement file $FD_{123}$" and "amplitude 0.5"
emit a characteristic sound with the parameters "sound file $S_{12}$" "duration 1 s" and "intensity 10."
Action 4 "LIFT ARM" corresponds to a composite sequence comprising a single primitive (131 to 134):
move your arm to the vertical with the parameters "movement file $FD_{33}$" and "amplitude 120."

The action selection system (100) classifies the rules (102 to 105) based on the proximity of the context (112 to 115) of each of these rules to the context computed from the content of the objects (81 to 88) contained in the memory (80), by a computation of distance in the N-dimensional space of the context.

This computation periodically provides a subset (110) of rules (102 to 104) associated with actions (122 to 124), in the form of a list ordered by relevance based on the aforementioned distance computation. The list is optionally filtered based on a threshold value to form a subset of rules the distance of which from the current context is less than this threshold value.

This subset (110) is then ordered based on a Satisfaction Indicator (IS). For this purpose, each rule is assigned to a variable numerical parameter IS at its execution. How this numerical parameter IS is determined will be explained hereinafter.

The subset (110) thus determined defines a set of ordered actions (122-124) associated with the rules (102-104) and used to control the operation of the robot's effectors.

Description of the Execution of Actions

The execution of actions (122 to 124) is carried out via the activation of primitives (131 to 134) the parameterization of which is determined by the content of the actions (amplitude of the movement, address of the sound sequence, intensity of the sound sequence, etc.).

The primitives (131 to 134) designate meta-functions, resulting in a computer code the execution of which is carried out by a set of commands (201 to 205) transmitted to software applications (211 to 215) or directly to effectors (41 to 43), optionally with parameters, for example:

Primitive P1 "emit a characteristic sound," with the parameters "sound file $S_{12}$," "duration 1 second" and "intensity 10" is associated with the following commands:
Load the sound file $S_{12}$ into the driver (61)
Adjust the amplifier level to level 10
Play the sound file $S_{12}$ for one second
Erase the driver memory (61).

Each primitive (131 to 134) is parameterized, if necessary, with:
its own parameters, transmitted by the action in the form of arguments
additional and contextual parameters determined based on the numerical parameter IS coming from the action
additional $VEI_X$ parameters, which will be explained hereinafter.

The activation of the primitives (131 to 134) is filtered by a resource manager (200) the object of which is to prevent commands that are contradictory or impossible to perform from being sent to the same effector (41). This filtering prioritizes the activation of the primitives associated with the actions (122 to 124) having the highest IS parameter.

For example, if among the list of selected actions (122 to 124) there is:
a first selected action (122) leading to the activation of a primitive managing the movement of the robot's arm, with a parameterization involving an upward movement
a second selected action (123) leading to the activation of the same primitive managing the movement of the robot's arm, but with a parameterization involving a downward movement
then the parameters applied to this same primitive managing the movement of the arm are incompatible, and the resource manager (200) prevents the action having the lowest IS parameter, and the parameterized primitive actually executed is the one resulting from the action having the highest IS parameter.

In another example, the resource manager (200) computes a new primitive from two primitives deemed incompatible, the parameterization of which is computed by weighting the parameterizations of the two incompatible primitives according to the IS parameter associated with each of them and thus corresponds to a compromise.

Learning of the Rules

According to an embodiment of the present disclosure, the recording of the rules (102 to 106) is carried out by speech learning.

For this purpose, a learning module (400) comprising a speech recognition and semantic analysis module analyzes the sentences pronounced by an operator to extract actions and contexts defining a new rule (106).

For example, if the human says a sentence such as "if you hear a loud noise, activate an audible signal," the module builds and saves a rule associating the action "ACTIVATE AN AUDIBLE SIGNAL" with the context "YOU HEAR A NOISE EXCEEDING A LEVEL X."

In another example, the learning module (400) also comprises means for kinetic recognition, to recognize a gesture, e.g., indicating an object. In this case, the learning module (400) further comprises an image analysis module, to allow learning by gestures combined with spoken words.

For example, the human indicates an object in the field of vision of the robot's camera and pronounces the sentence "IF YOU SEE THIS #OBJECT, GRASP IT," leads to the recording of the rule made up of the action "GRASP THE OBJECT" associated with the context "SEE OBJECT '#OBJECT.'"

In a third example, the learning module (400) comprises means for learning by mimicry or by recurrence: when the robot records a same action associated with a same context repeatedly, it triggers the recording of a new rule associating this action with this context.

For example, when the human systematically answers "You're welcome" to "Thank you" stated by the robot, the robot creates the rule associating the action "SAY YOU'RE WELCOME" to the context "A HUMAN SAYS 'THANK YOU.'"

The combinations of actions and contexts are constructed based on the value of the rapport parameter $VEI_4$ computed for each pair of an action and a context, during the interactions between the human and the robot.

Obviously, the rules (102 to 106) may also be recorded by programming.

Computation of the IS Parameter

Each rule (102 to 106) in the declarative memory (101) is associated with an IS (Satisfaction Indicator) parameter, which is recomputed after each execution of the associated action (112 to 116), based on the current value of the parameter $VEI_3$.
If the $VEI_3$ value is high, i.e., higher than a reference value, then the IS parameter of the rule whereby the action has been executed is increased
If the $VEI_3$ value is low, i.e., lower than a reference value, then the IS parameter of the rule whereby the action has been executed is reduced.

The value of the IS parameter is used to order the actions (112-116) and to prioritize access to the resources by the resource manager (200) to the actions associated with the IS parameter having the highest value.

Knowledge Pooling

In the aforementioned examples, the rules (102 to 106) are stored in the local memory of a robot.

According to one embodiment, several robots share a common memory for storing the robots' rules, with each robot maintaining its own IS parameter.

For example, the declarative memory (101) of the action selection system (100) of a robot is periodically synchronized with the content of a server shared between a plurality of robots via the communication module (36).

The learning of a new rule (106) in the action selection system (100) of a particular robot enriches the behavior of the action selection systems (100) of the plurality of robots accessing the server, while maintaining its own internal state values VEI and its own rule priority order (102-106), based on its own IS indicator.

Description of the computation of the $VEI_X$ parameters

The $VEI_X$ (Internal State Variables) parameters are variables between 0 and 1 representative of the internal state of the robot:

$VEI_1$ represents the state of waking or activation of the robot.

The value 0 corresponds to an inactivity of the robot where the robot is almost motionless and silent, with an appearance of sleeping The value 1 corresponds to a state of overexcitation wherein the robot's movements have a maximum amplitude, with a dilated pupil appearance for robots with an animated face, frequent and jerky movements, etc.

For example, the value of the $VEI_1$ parameter is computed on the basis of the evolution of the robot's environment: if the information perceived by the sensors (2 to 5) is stable and the robot detects no human, the value will be low.

in the event of rapid changes in the environment detected by the sensors (2 to 5), or if the presence of a human being is detected, the value of the $VEI_1$ parameter will be increased.

$VEI_2$ represents the robot's state of surprise.

The value 0 corresponds to a nominal activity of the robot

The value 1 corresponds to sudden and isolated variations of the effectors (sudden movements of the joints, sudden changes in sound level, etc.)

For example, the $VEI_2$ parameter is computed based on the temporal variations of the $VEI_1$ parameter, for example, by computing a derivative of $VEI_1$ $VEI_3$ represents the robot's apparent state of satisfaction.

The value 0 corresponds to a disappointed physical appearance of the robot (mainly looking down, arm directed downwards, etc.)

The value 1 corresponds to a proud physical appearance of the robot (mainly looking up, position of the joints giving a proud appearance, etc.)

For example, the $VEI_3$ parameter is computed on the basis of certain interactions between the human and the robot, such as:

Detection of a facial expression such as smiling or anger

The duration of certain interactions

The accomplishment of an internal process of the robot.

$VEI_4$ represents the state of rapport between the robot and the humans with whom it interacts.

The value 0 corresponds to a low level of interaction and activation of the effectors The value 1 corresponds to a strong activation of the effectors and a tendency for mimicry between the robot and the human with whom it interacts, and a tendency for the robot to move in the direction of this human and for the robot to direct its gaze toward this human.

This parameter may be calculated through steps of controlling coded functions of stimuli from the user and acquiring the effect induced on the user to deduce the level of empathy based on the conformity between the stimulus and the image acquired.

For example, the $VEI_4$ parameter is computed on the basis of the level of mimicry between the human and the robot, i.e., the rate of movement of the human reproducing the robot's movements with a small time lag, or reacting in a predicted manner to the robot's movement with a small time lag, or certain interactions between the human and the robot, such as:

detecting physical contact between the human and the robot.

$VEI_5$ represents the robot's state of joy.

A value of 0 corresponds to an appearance of sadness (downward gaze, drooping mouth area, neutral prosody, sagging joints, etc.)

The value 1 corresponds to a strong activation of the effectors and a tendency to smile and make appropriate sounds.

For example, the $VEI_5$ parameter is computed on the basis of the detection of a smile on the human's face and the result of a combination of the other $VE_X$ parameters.

In general, the $VEI_X$ parameters are computed by modules (181 to 185) from the data supplied by the memory (80) determining the representation of the world by the robot based on the data acquired by the set of sensors (2 to 5) and the information representative of the state of the robot for the determination of the synchronisms between the robot and the human.

The $VEI_1$ to $VEI_5$ parameters are also computed on the basis of internal criteria, independent of the robot's external environment. These criteria take into account, for example:

the duration of maintaining a $VEI_X$ parameter at a constant level causes a progression toward a reference value the frequency of changes in the $VEI_X$ value weights the amplitude of the changes the saturation of the impact of a trigger factor affecting a $VEI_X$ parameter The result of the processing periodically provides updated values for the $VEI_X$ parameters, which modulate the perception functions (71 to 75) and the primitives (131 to 134), as well as the action selection module (100).

For example:

The speed of a motor is proportional to the value of the $VEI_1$ parameter

The sound file S is selected based on the values of the $VEI_1$ to $VEI_5$ parameters.

The functions for computing the $VEI_X$ parameters may be determined by an initial characterization step involving recording experimental data obtained by a process including subjecting persons to a plurality of stimuli and associating with each of the stimuli corresponding to the perception functions a level of perception [pleasure, satisfaction, alertness, surprise, etc.].

The invention claimed is:

1. A method for controlling a plurality of effectors of a robot by a plurality of primitives made up of parameterizable coded functions:

the plurality of primitives being activated conditionally by an action selection system, the action selection system:

comprising a declarative memory wherein is stored a dynamic library of rules, each associating a context with an action; and based on a list of coded objects stored in a memory determining the robot's representation of the world, the coded objects stored in the memory being computed by perception functions;

the perception functions being computed from signals provided by one or more sensors of the robot;

wherein the method is based on associating, in every step, coded objects with a sequence of characters corresponding to their semantic description, comprising:

a semantic description of the coded objects stored in the memory, made up of a string of characters representing a perception function of the robot and another string of characters representing a perceived object;

a semantic description of the activated primitives made up of a string of characters representing a possible action of the robot and another, optional string of characters representing optional parameters of the possible action of the robot;

a semantic description of the rules, made up of the combination of a string of characters representing the associated context and another string of characters representing an associated action; and recording new rules associated with one or more new actions and one or more new contexts, via a learning module comprising a speech recognition, a gesture recognition, a mimicry recognition, and a semantic analysis module which analyzes sentences pronounced by an operator to extract the one or more new actions and the one or more new contexts defining the new rules.

2. The method of claim 1, wherein the action selection system classifies the rules based on a similarity of the context of each of the classified rules to the context computed from a content of the coded objects contained in the memory and selects the actions associated with the rules relevant to the context.

3. The method of claim 1, further comprising a step of computing, for each rule, an IS parameter, which is recomputed after each execution of an associated action, an order of priority of the actions selected by the action selection system being determined based on a value of the IS parameter associated with each of the actions.

4. The method of claim 1, further comprising steps of communicating with other robots via a communication module and a shared server, the declarative memory of the action selection system of the robot being periodically synchronized with content of the shared server.

5. The method of claim 1, wherein the activation of the primitives of the plurality by the actions is filtered by a resource manager ensuring compatibility of commands sent to the effectors.

6. The method of claim 1, further comprising:

steps for constantly updating, in the background, internal state variables $VEI_X$, based on the evolution of objects stored in the memory; and steps for parameterizing the activated primitives of the plurality, the perception functions and the action selection system based on values of the internal state variables $VEI_X$.

7. A robot comprising a plurality of effectors controlled by a plurality of primitives made up of parameterizable coded functions, the plurality of primitives being activated conditionally by an action selection system, the action selection system:

comprising a declarative memory wherein is stored a dynamic library of rules, each associating a context with an action; and based on a list of coded objects stored in a memory, determining the robot's representation of the world, the coded objects stored in the memory being computed by perception functions;

the perception functions being computed from signals provided by one or more sensors of the robot;

wherein the plurality of activated primitives are controlled by a method based on associating, in every step, coded objects with a sequence of characters corresponding to their semantic description, comprising:

a semantic description of the coded objects stored in the memory, made up of a string of characters representing a perception function of the robot and another string of characters representing a perceived object;

a semantic description of the activated primitives made up of a string of characters representing a possible action of the robot and another, optional string of characters representing optional parameters of the possible action of the robot;

a semantic description of the rules, made up of the combination of a string of characters representing the associated context and another string of characters representing an associated action; and recording new rules associated with one or more new actions and one or more new contexts, via a learning module comprising a speech recognition, a gesture recognition, a mimicry recognition, and a semantic analysis module which analyzes sentences pronounced by an operator to extract the one or more new actions and the one or more new contexts defining the new rules.

* * * * *